United States Patent Office 3,518,763
Patented July 7, 1970

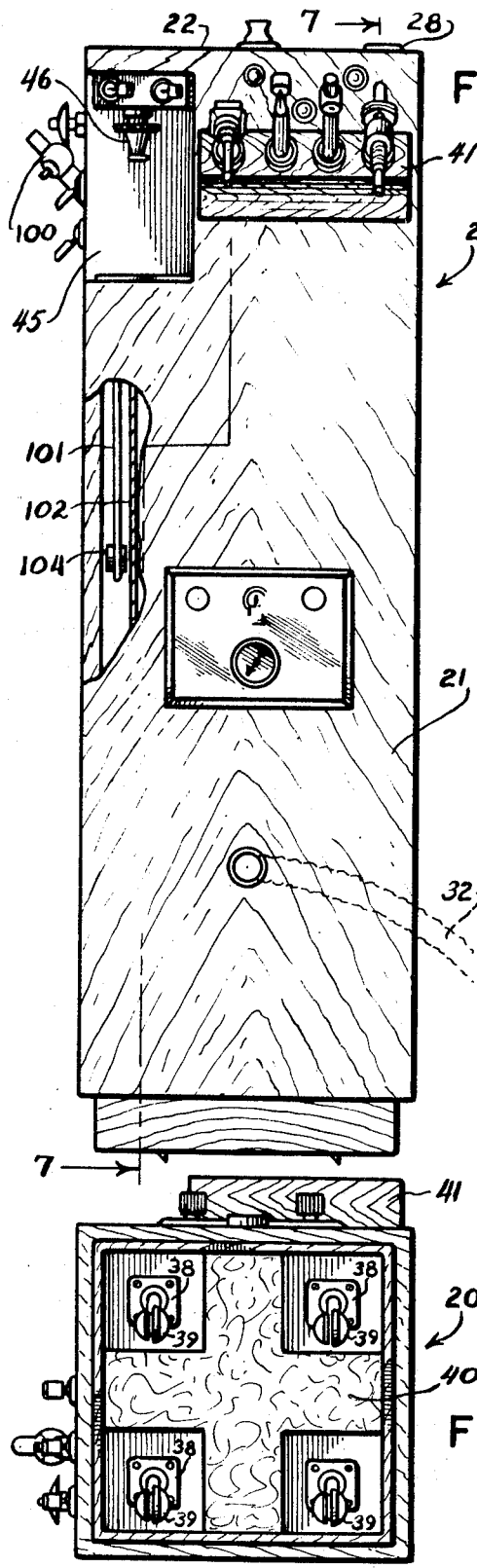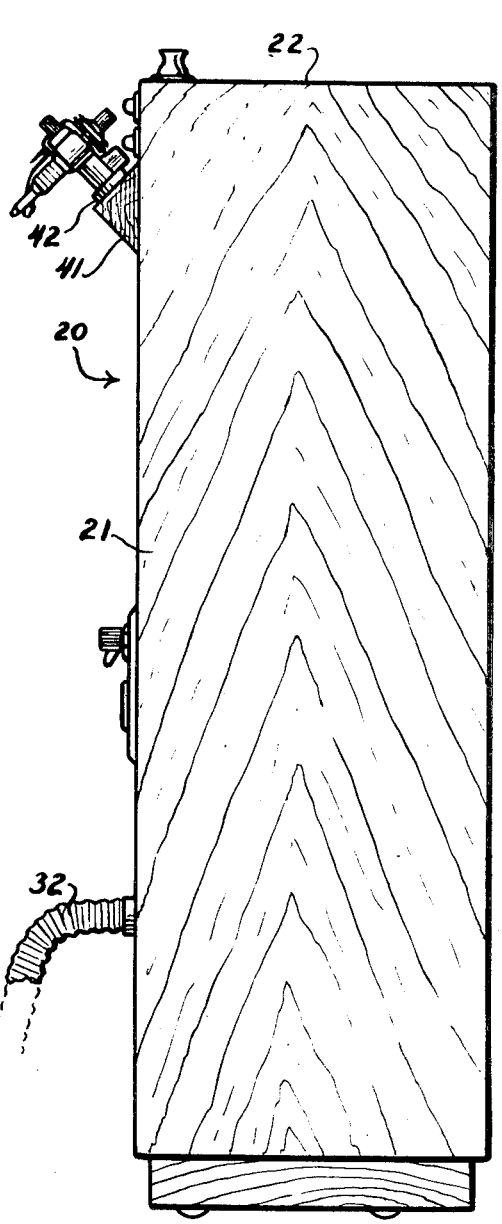

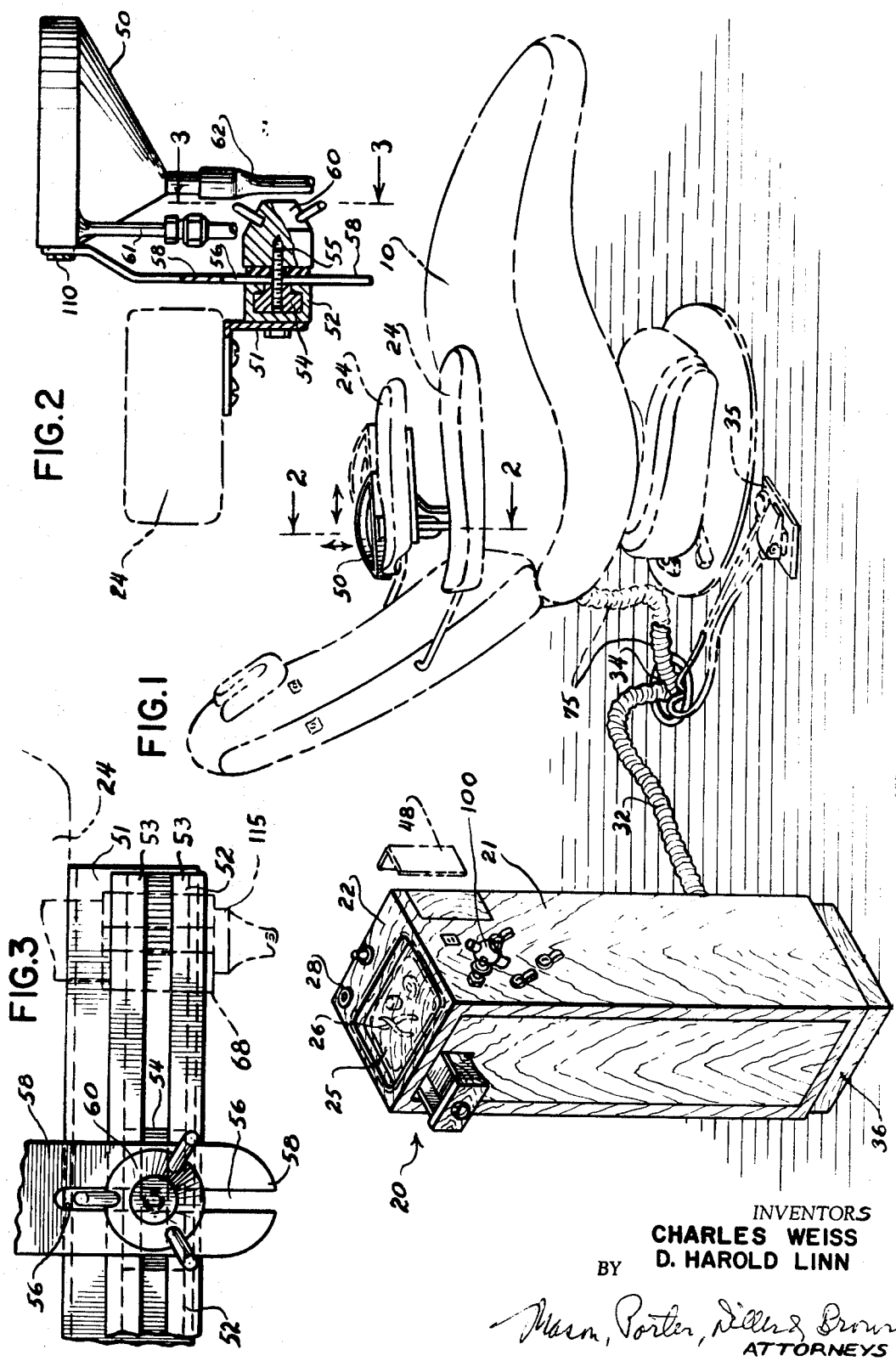

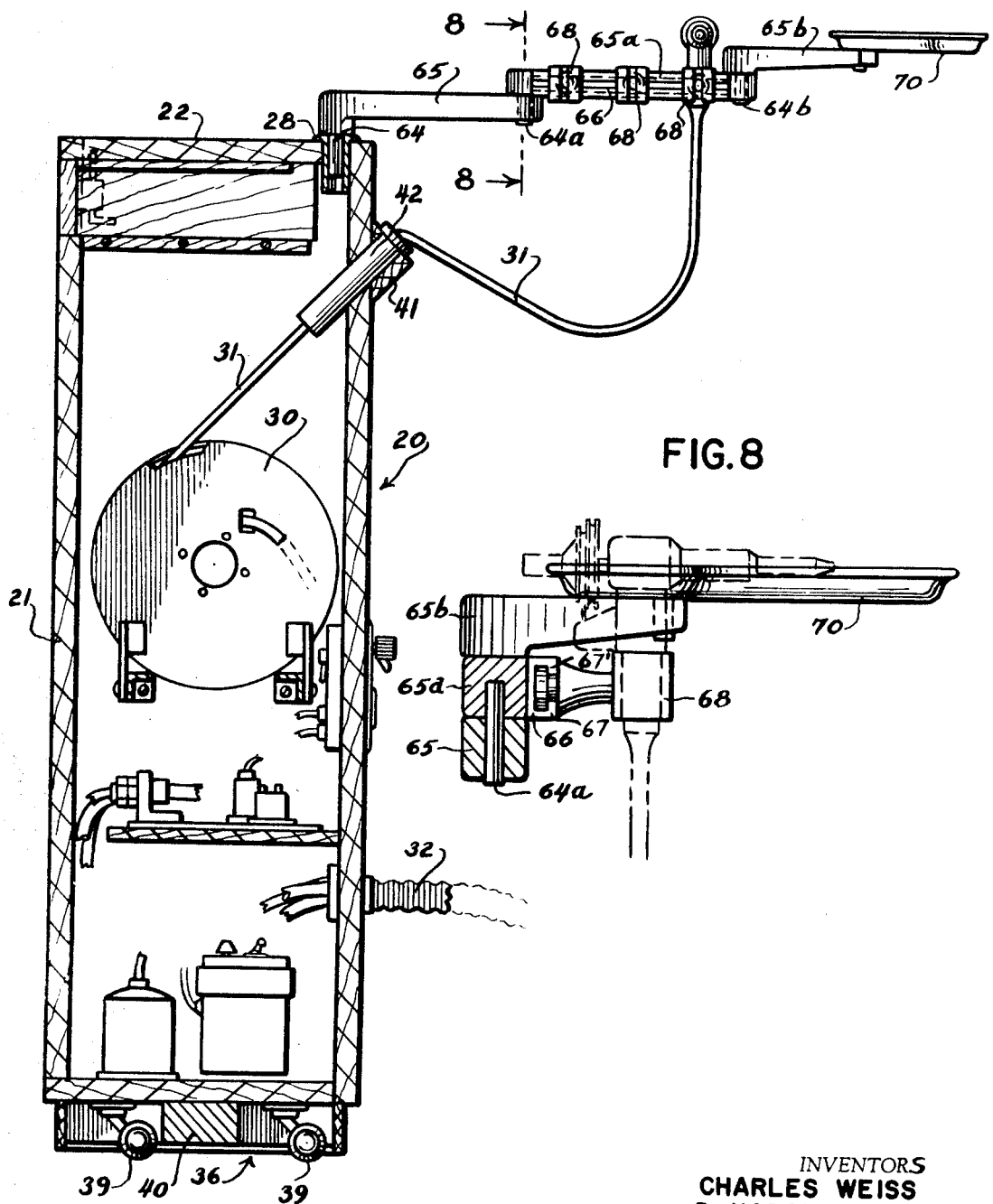

3,518,763
SUPPORT FOR DENTAL ACCESSORIES
Charles M. Weiss and David Harold Linn, New York, N.Y., assignors, by mesne assignments, to Pennwalt Corporation, a corporation of Pennsylvania
Continuation of application Ser. No. 309,232, Sept. 16, 1963, now Patent No. 3,302,290, dated Feb. 7, 1967. This appplication Feb. 6, 1967, Ser. No. 614,286
Int. Cl. A61c 19/02
U.S. Cl. 32—22                                     8 Claims

ABSTRACT OF THE DISCLOSURE

A dental unit and support means for dental instruments and accessories providing for convertibility of the dental unit when using traditional techniques or the recent innovation of time-motion techniques. Hand pieces, syringes, vacuum nozzles, aspirators, and the like, are provided with holders being separately adjustable so that the dentist can arrange the various instruments into the most preferred arrangements and locations.

Cross-reference to related application

This is a continuation of application Ser. No. 309,232, filed Sept. 16, 1963, which issued as Pat. No. 3,302,290 on Feb. 7, 1967.

Background of the invention

The invention relates to dental units and support means for dental instruments and accessories wherein the support means are provided with adjustable mounting means to provide for positioning the instruments and accessories in a multitude of positions as desired by the dentist.

Description of the prior art

The prior art is relatively inflexible both as to usage and function and is relatively unadjustable and unconvertible from arrangements which are adaptable for practicing traditional techniques to arrangements which are particularly adaptable for use in practicing the newest innovations of time-motion techniques.

Summary

The present invention is particularly advantageous in that it provides a dentist with operating equipment wherein the various hand pieces, syringes, vacuum nozzles, aspirators cuspidor, etc., can be variously mounted in locations which are particularly adaptable to the technique of dentistry being practiced and particularly adaptable to patients of various sizes.

Brief description of the drawings

FIG. 1 is a perspective view of a dental unit located adjacent a dental operating chair, with the chair and some of the controls illustrated in phantom.

FIG. 2 is a sectional elevational view taken on the line 2—2 of FIG. 1.

FIG. 3 is a sectional elevational view taken substantially along line 3—3 of FIG. 2 illustrating one manner of attachment of a cuspidor or a hand piece to the arm of the dental operating chair.

FIG. 4 is a front elevational view of the dental unit.

FIG. 5 is a side elevational view of the dental unit taken from the right side of FIG. 4.

FIG. 6 is a bottom plan view of the dental unit.

FIG. 7 is a sectional elevational view taken substantially along line 7—7 of FIG. 4 and illustrates one embodiment of a tray assembly mounted upon the dental unit.

FIG. 8 is a sectional elevational view taken substantially along line 8—8 of FIG. 7 and illustrates one manner of supporting dental instruments thereon.

Description of the preferred embodiments

Illustrated in FIG. 1 is a dental operating chair 10. The chair 10 is preferably of the contour type wherein the backrest portion thereof is adjustable between an upright and a reclined position.

The dental unit 20 is in the form of a frame or stand which will support the various appliances necessary to the practice of dentistry. The dental unit 20 consists generally of a hollow pillar-like stand which is relatively small and generally square in horizontal cross section.

As illustrated, the dental unit 20 has a horizontal top 22 located somewhat above an arm 24 of the dental chair 10 and at a convenient elevation for the dental practitioner. The top 22 includes a recessed portion 25 for receiving sterilized trays and to certain various operating instruments as at 26. As will be explained hereinafter, the same trays may function in conjunction with extension arms 65 (FIG. 7).

As will be seen especially in FIG. 7, the stand 21 incorporates therewithin most of the equipment, connections, drives, and the like, for operation of the dental unit 20. The interior workings of the dental unit 20 will not be described in detail as individually it will form no part of the inventive concept of this invention, with the provision that such components must be arranged and installed within the interior of the stand 21. Incorporated within the stand 21 are a plurality of pulleys 30 to retain tubing 31 and the like which is necessary for the operation of the usual dental accessories. The pulleys may be spring-loaded to wind the tubing 31 thereon. Thus, the dental accessories may be urged away from the dental unit 20 and will return to the unit or to the appropriate holder when released.

As will be seen especially in the broken-away portion of FIG. 4, a central suction connection 100 requires a somewhat different method of extending and retracting its connecting tube 101 in view of the size and relative inflexibility of the tubing. As shown in FIG. 4, the central suction tubing 101 is located in spaced relation between an exterior wall of the unit and an interior wall 102. The tubing 101 is looped within the housing 20 and trained under a freely suspended weight 104. The weight 104 is preferably cushioned on the sides thereof for silencing and has little clearance with the exterior wall and interior wall 102. Thus, the weight 104 biases the tubing 101 in a downward direction to retract the central suction connector 100 to the position shown in FIG. 4. When the connector 100 is urged away from the dental unit 20, the length of tubing 101 within the unit 20 is somewhat shortened and urges the weight 104 in an upward direction. When the connector 100 is released, the weight 104 will retract the connector 100 back to its original location.

Flexible tubing 32 interconnects the interior of the dental unit 20 with an opening 34 which is preferably located in the floor adjacent the dental chair 10. Tubing 32 encases the various tubing and wires from the opening 34 to the interior of the dental unit 20. Included within tubing 32 are those wires and tubes necessary to control the actuation of the individual components of the dental unit remotely in conjunction with the usual floor pedals 35 or by controls installed suitably on the rear of the back of the dental operating chair 10.

For ease of connection, a suitable monifold is supplied in conjunction with this unit. The manifold, installed under the floor, provides the required utility connections and has a form of coded and quick-disconnect connections with the flexible tubing 32. This facilitates the installation of the unit and its possible use in more than one operating room.

A base 36 is provided with a plurality of swivel mounts 38 rotatably supporting wheel 39. The wheels 39 provide for easy movement of the dental unit about the dental operating chair or to another operating room.

Weights 40 are provided at the bottom of the dental unit in order to provide stability and prevent tipping thereof. The weights 40 are comprised of lead or the like, with cut-outs for the wheels 39. The weights 40 insure stability of the unit, despite its small size, and notwithstanding the equipment which may be fastened to the extension arms 65 at the top thereof.

Adjacent the horizontal top 22 is an angular support 41 containing a plurality of collars 42. Each of the collars 42 will guide one of the tubes 31 and will support the appropriate dental operating accessory at the end of its tube 31. Thus, the usual operating accessories will be supported on the angular support 41 as shown in FIG. 4. The dental practitioner will be able to grasp any of the operating accessories readily and urge the same away from the unit 20 and toward the patient against the urging of its respective pulley 30.

An especially important feature of this invention is the separator cuspidor 50 and the coverable water niche 45 in the stand 21. The water niche 45, is best shown in FIG. 4, is provided by a cut-out in the side of the stand 21 adjacent the top thereof. The cut-out is of sufficient size to receive a cup or the like to be filled with water. A suitable spout 46 is positioned centrally at the top of the water niche 45 so as to provide a quick and ready means of water supply. A suitable drain (not shown) is installed at the bottom of the water niche 45.

As shown in FIG. 1, the water niche 45 can be concealed by an angular cover 48 when the dentist is using the time-motion technique, thereby concealing the water niche 45 from the patient's view.

As shown in FIG. 1, a cuspidor 50 is mounted on an arm 24 of the dental operating chair 10. An advantage of such mounting is that the cuspidor will, to a limited extent, move rearwardly with the patient as the chair is adjusted to a reclined position. It is desirable that the cuspidor 50 be removable. For this purpose, a quick-disconnect is provided between the cuspidor 50 and the arm 24. Further, the quick-disconnect is of a type which will permit adjustment of the cuspidor 50 on the arm 24 and will also permit the installation of other operating accessories such as hand pieces, syringes, etc.

Referring to FIGS. 2 and 3, a bracket member 51 is shown attached to an arm 24 of the chair 10. The bracket member 51 includes an elongated track 52 which is defined by a pair of inturned portions or guide bars 53 which are disposed substantially parallel and in spaced relation for defining an elongated guide slot in which an insert 54 is slidably mounted. A threaded member 55 is connected to the insert 54 and projects horizontally therefrom so as to provide receiving means which are adapted to receive accessories and provide for adjustment of such accessories along the track 52. The cuspidor 50 is removably connected by a clip member 110 to an upstanding bracket arm 58 which is provided with an open-ended slot 56. A second threaded member in the form of a hand knob 60 will threadedly connect to the threaded member 55 in a manner so as to be easily tightened or loosened as desired. The slot 56 is vertically elongated to provide adjustment of the height of the bracket arm 58 and the cuspidor 50 relative to the chair arm 24, and to permit the quick removal of the bracket arm 58 and the cuspidor 50.

The receiving means, which includes insert 54 and threaded member 55, may be loosened by conventional rotation of the threaded member or knob 60. After the insert 54 is adjusted longitudinally in position along the track 52, and after the cuspidor 50 is adjusted to the proper height by urging the bracket arm 58 to move relative to the threaded member 55, the knob 60 can be tightened to securely lock the parts in position. Thus, an important feature of this invention is that the cuspidor 50 may be quickly and easily positioned for the convenience of the patient and dentist merely by the tightening or loosening of a single knob 60.

Similarly, the entire cuspidor together with its water line 61 and waste tube 62 may be freely lifted from the bracket arm 58 along with clip member 110. Also, by loosening knob 60, the cuspidor 50 and bracket arm 58 can be entirely removed from the bracket member 51 and stored out of sight.

It is preferable to provide means whereby the dental operating equipment may be positioned closer to or overlying a patient. For this purpose, tray assembly means are provided as shown primarily in FIGS. 7 and 8. A bushing 28 is provided in the top surface 22 of the dental unit 20. The bushing 28 has an internal diameter of sufficient size to receive a shaft-like extending member 64 connected to one end of a horizontally disposed arm member 65. The member 65 has an opening at the opposite end thereof of sufficient size to receive a similar shaft-like extending member 64a. The member 64a will project from a second horizontally extending arm member 65a. Similarly, the external end of member 65a will have an opening to receive a third shaft-like extending arm member 65b. Thus, it is apparent that a plurality of arm members may be adapted to fit on the external ends of each other, building up any desired assembly to fit into an area adjacent or overlying a patient. One of the horizontally extending members 65a may have a longitudinally extending bracket member 66 which includes a first guide bar 67, which defines an elongated track, and a second guide bar 67' substantially parallel to and spaced from the guide bar 67 so as to define an elongated slot. The bracket member 66 is adapted to receive one or more instrument holders 68 for receiving and supporting any of the dental operating instruments usually located and positioned in the collars 42 of dental unit 20. Thus, the instruments may be moved when desired from the angular support 41 to the supports 68 suitably positioned for the convenience of the dentist. The tray assembly also includes a tray 70 which is supported upon one of the arm members 65, 65a, or 65b.

It will be apparent that the bracket member 66 can also be used to mount to cuspidor 50 and bracket arm 58, while the bracket member 51 and track 52 can be used to adjustably mount hand pieces thereon such as shown in phantom at 115 in FIG. 3.

In one embodiment of the invention, controls for the dental operating hand pieces and the like are positioned at the rear of the back surface of the chair 10. The necessary controls can be coupled to the dental unit 20 by an additional flexible hose 75 (FIG. 1).

It will be apparent from the foregoing that there has been disclosed various embodiments of supports for dental accessories, and it is to be understood that variations may be provided without departing from the scope of the invention.

We claim:

1. A support for adjustably positioning dental accessories, such as handpieces, syringes, vacuum nozzles, aspirators and the like, comprising a bracket member having at least one guide bar defining an elongated track, mounting means for mounting said bracket member in a desired location, and a plurality of receiving means for said dental accessories, each of said receiving means being separately adjustably mounted on said bracket member.

2. A support as defined in claim 1 in combination with a dental chair, said bracket member being mounted on said dental chair by said mounting means, said guide bar being disposed substantially horizontally, said receiving means being slidably mounted on said guide bar for adjustment along said elongated track.

3. A support for adjustably positioning dental accessories comprising a bracket member having at least one guide bar defining an elongated track, mounting means for mounting said bracket member in a desired location, and a plurality of receiving means adjustably mounted on said bracket member for receiving dental accessories, a dental chair, said bracket member being mounted on said dental chair by said mounting means, said guide bar being disposed substantially horizontally, said receiving means being slidably mounted on said guide bar for adjustment along said elongated track, wherein a cuspidor is connected to one of said receiving means, said one receiving means comprising a first threaded member supported at least partially by said guide bar and slidable therealong, a bracket arm connected to said cuspidor, means for adjustably mounting said bracket arm and cuspidor on said one receiving means for substantially vertical adjustment relative to said bracket member, and a second threaded member cooperable with said first threaded member for fixing said one receiving means in a horizontally adjusted position and for fixing said bracket arm in a vertically adjusted position.

4. A support as defined in claim 3 wherein a clip member is provided for detachably connecting said cuspidor to said bracket arm.

5. A support as defined in claim 2 wherein said bracket member is mounted on an arm of said dental chair, said bracket member extending along a horizontal longitudinal extent of said arm whereby a dental accessory on one of said receiving means may be adjustably positioned along the length of said arm by moving said one receiving means along said guide bar.

6. A support for adjustably positioning dental accessories comprising a bracket member having at least one guide bar defining an elongated track, mounting means for mounting said bracket member in a desired location, a plurality of receiving means adjustably mounted on said bracket member for receiving dental accessories, wherein a second guide bar is disposed in spaced relation to said one guide bar and substantially parallel thereto for defining an elongated guide slot, said receiving means including a first threaded member captured by said guide bars and slidable substantially horizontally along said elongated guide slot.

7. A support as defined in claim 1 in combination with a dental tray assembly, said tray assembly including at least one arm and a tray connected thereto, said bracket member being mounted on said tray assembly by said mounting means, said guide bar being disposed in a substantially horizontal position.

8. A support as defined in claim 7 wherein said bracket member is mounted on said one arm of said tray assembly.

References Cited
UNITED STATES PATENTS

| | | | |
|---|---|---|---|
| 1,604,193 | 10/1926 | Pieper | 32—22 XR |
| 1,714,412 | 5/1929 | Weber | 32—22 |
| 2,749,196 | 6/1956 | Wolfe | 248—287 XR |
| 3,129,033 | 4/1964 | Emmelson | 32—22 XR |
| 3,197,868 | 8/1965 | Guichet | 32—22 |

ROBERT PESHOCK, Primary Examiner